Patented May 3, 1949

2,469,338

UNITED STATES PATENT OFFICE 2,469,338

PREPARATION OF GUANIDINE PHOSPHATES

Johnstone S. Mackay, Old Greenwich, Conn., assignor to American Cyanamid Company, New York, N. Y., a corporation of Maine No Drawing. Application December 24, 1946, Serial No. 718,274

7 Claims. (Cl. 260—564)

1

The present invention relates to the production of guanidine values and more particularly to a new method whereby such values may be provided in the form of guanidine phosphates.

An object of the present invention is to provide guanidine values and more specifically guanidine phosphates at low cost by a process employing cheap reactants and simple apparatus and procedures.

Another object of the present invention is to provide guanidine values employing urea as a starting material in a process avoiding the use of superatmospheric pressures of ammonia and expensive catalysts.

Other objects will be apparent from the discussion that follows hereinafter.

Heretofore, the practical methods for the production of unsubstituted guanidine salts were restricted to the use of cyanamide, guanylurea, dicyandiamide, and ammonium thiocyanate as starting materials. Attempts to use the cheaper urea as a starting material were not successful, particularly from the standpoint of their adaptability to large scale production. In one attempt, urea was ammonolyzed at highly elevated temperatures and pressures of ammonia. An unfavorable equilibrium, a low rate of reaction and a side-reaction between the product and the water formed in the reaction resulted in long periods of reaction being required to obtain low yields. In another attempt to employ urea the difficulties inherent in the first process were attemptedly overcome by employing certain metallic catalysts, or accelerators, and dehydrating agents. In spite of the use of such expensive accelerators and dehydrating agents periods of reaction of the order of 5–8 hours were still required to obtain low yields of the guanidine salts.

It has now been found that urea may be reacted with phosphorous pentoxide to result in the formation of a guanidine phosphate. The reaction does not require the presence of ammonia let alone the superatmospheric pressures of this reactant which have been employed heretofore, nor are any expensive catalyst such as those employed in the past required. In addition, the periods of reaction required to obtain highly satisfactory yields are shorter than those shown in the aforementioned prior work. Thus, there is provided a practical process employing a reactant that is lower in cost than any of those employed heretofore and requiring only the simplest apparatus and procedures.

In general, reaction may be carried out by simply fusing the reactants and thereafter heating to a suitable temperature for a short period of time to permit the reaction to occur. Thereafter, the reaction mixture is cooled and extracted with water to obtain an aqueous solution of guanidine phosphate from which the same or the free guanidine or other guanidine salts may be prepared by conventional procedures detailed more fully hereinafter. While the reaction is most conveniently carried out by fusion of the reactants, the use of suitable solvents and/or diluents, such as the high boiling amines, N-isoamylaniline, di-N-amylamine, the hydrocarbons, tetraline, -methylnaphthalene, the nitriles, m-tolunitrile, cinnamonitrile, glutaronitrile and other inert materials is also permissible. However, such materials generally provide no advantage and aside from the expense imposed by their use there is sometimes the problem of separating the desired guanidine salts therefrom.

While the reaction may be carried out over a wide range of temperatures, it is preferred to employ a temperature within the range of substantially 190°–300° C., and still more preferable to employ a temperature within the range of 210°–250° C. At temperatures substantially below 190° C. the reaction progresses somewhat slowly making the use of such temperatures somewhat impractical, whereas at temperatures substantially above 300° C. decomposition of the desired guanidine phosphates begins to become appreciable.

Example

A mixture of 40 g. of urea and 24 g. of phosphorous pentoxide was fused to provide a melt at a temperature of about 130° C. Thereafter, the temperature was raised to 235° C. to obtain a mildly exothermic reaction. In all, the temperature of the melt was maintained at about 235° C. for ½ hour. The reaction mixture was then cooled, ground to some extent and leached with hot water to obtain the guanidine phosphate which was predominantly the diguanidine phosphate. The amount of such phosphate obtained was 12.4 g. or 47% of theory calculated as the diguanidine phosphate.

In other experiments the same ratio of urea to phosphorous pentoxide was employed at different temperatures of reaction to show the temperature of substantially 235° C. to be optimum for the reaction. Also, other experiments have been carried out employing different ratios of the two reactants to show that the use of smaller proportions of the phosphorous pentoxide results in lower yields of the desired guanidine values.

The use of higher proportions of the phosphorous pentoxide results in somewhat higher yields of the guanidine values but the increased yields obtained are not sufficiently great to offset the cost of using more of the phosphorous pentoxide. The practical object of the process of the invention is to convert the urea molecule to the guanidine molecule. The combination of the higher molecular weight of the phosphorous pentoxide and its greater cost per pound obviously prohibit the excessive use of this reactant. Thus, while, as aforementioned, the use of more phosphorous pentoxide results in somewhat higher yields of guanidine values, the cost of those values in terms of the cost of the reactants employed is the determining factor. Experiments have shown that the most economical ratio of urea to phosphorous pentoxide to employ is one in which 1 mol of phosphorous pentoxide to 2–10 mols of urea are employed, a ratio of 1:4 being more preferable.

Because of the economic considerations controlling the ratio of reactants the guanidine values provided by the process of the present invention are usually predominantly in the form of the diguanidine phosphate although the mono- and triguanidine phosphates are also formed. Obviously, the more acidic monoguanidine phosphate may be readily prepared therefrom by acidifying an aqueous solution of the diguanidine phosphate with phosphoric acid, or by the addition of phosphorous pentoxide. The more basic triguanidine phosphate may likewise be readily prepared by adding the free guanidine to an aqueous solution of the diguanidine phosphate. The guanidine phosphates may be isolated from their aqueous solutions despite their rather high solubility in such solutions by virtue of their rather marked differential solubility in water. For example, the diguanidine phosphate is soluble to the extent of 159 g. per 100 g. of water at 90° C., whereas it is only soluble to the extent of 22.5 g. per 100 g. of water at 30° C. and to the extent of 15.5 g. per 100 g. of water at 20° C. Thus, on concentrating an aqueous solution of the desired salt by boiling satisfactory yields of such guanidine phosphate are obtained on cooling the solution to room temperature or below.

The guanidine values may also be recovered as free guanidine by dissolving the dry reaction mixture in an alcohol such as ethanol, adding an excess of potassium hydroxide to precipitate the phosphate ion as potassium phosphate and thus provide an alcoholic solution of the free base. Such free guanidine may be isolated from solution, if desired, by conventional procedures although generally some difficulty is experienced in applying the usual methods for inducing crystallization to the isolation of the guanidine.

Such guanidine values may also be isolated by forming a less soluble salt such as a picrate, the preparation of such less soluble salts being effected by simply adding a sufficient amount of the corresponding acid to an aqueous solution of the phosphate and inducing crystallization by conventional means such as concentrating and cooling the solution.

The guanidine phosphates provided by the process of the present invention are valuable chemicals being useful as fire-proofing agents, in the preparation of resins and blueprint materials and as intermediates in the preparation of chemotherapeutic agents, pharmaceuticals, surface active agents, and the like.

While the invention has been described with particular reference to specific embodiments, it is to be understood that it is not to be limited thereto but is to be construed broadly and restricted solely by the scope of the appended claims.

What is claimed is:

1. The process of preparing a guanidine phosphate comprising reacting urea with phosphorous pentoxide at a temperature within the range of substantially 190°–300° C. at atmospheric pressure.

2. The process of preparing a guanidine phosphate comprising reacting urea with phosphorous pentoxide at a temperature within the range of substantially 210°–250° C. at atmospheric pressure.

3. The process of preparing a guanidine phosphate comprising reacting urea with phosphorous pentoxide at a temperature within the range of substantially 190°–300° C. in a ratio of substantially 1 mol of phosphorous pentoxide to substantially 2–10 mols of urea at atmospheric pressure.

4. The process of preparing a guanidine phosphate comprising reacting urea with phosphorous pentoxide at a temperature within the range of substantially 210°–250° C. in a ratio of substantially 1 mol of phosphorous pentoxide to substantially 2–10 mols of urea at atmospheric pressure.

5. A process of preparing a guanidine phosphate comprising fusing substantially 1 mol of phosphorous pentoxide with substantially 2–10 mols of urea at a temperature within the range of substantially 190°–300° C. at atmospheric pressure.

6. A process of preparing a guanidine phosphate comprising fusing substantially 1 mol of phosphorous pentoxide with substantially 2–10 mols of urea at a temperature within the range of substantially 210°–250° C. at atmospheric pressure.

7. A process of preparing a guanidine phosphate comprising fusing substantially 1 mol of phosphorous pentoxide with substantially 4 mols of urea at substantially 235° C. at atmospheric pressure.

JOHNSTONE S. MACKAY.

REFERENCES CITED

The following references are of record in the file of this patent:

UNITED STATES PATENTS

| Number | Name | Date |
| --- | --- | --- |
| 1,440,056 | Clarkson et al. | Dec. 26, 1922 |
| 2,089,697 | Groebe | Aug. 10, 1937 |
| 2,338,987 | Watzel | Jan. 11, 1944 |
| 2,350,850 | Watzel | June 6, 1944 |

FOREIGN PATENTS

| Number | Country | Date |
| --- | --- | --- |
| 527,237 | Germany | June 23, 1931 |

OTHER REFERENCES

Weltzien, "Liebigs Annalen," vol. 107 (1858), pp. 219, 220 and 222.

Beilstein, "Handbuch der Chemie," vol. III, 4th edit. (1921), p. 47.